United States Patent [19]

Kent

[11] Patent Number: 4,689,766

[45] Date of Patent: Aug. 25, 1987

[54] SYSTEM FOR RESETTING THE OPERATION OF A SIGNAL PROCESSING DEVICE UPON THE FAILURE OF ACCESSNG A PREDETERMINED MEMORY LOCATION WITHIN A PREDETERMINED TIME INTERVAL

[75] Inventor: Dallas L. Kent, Evanston, Ill.

[73] Assignee: Zenith Electronics Corporation, Glenview, Ill.

[21] Appl. No.: 672,307

[22] Filed: Nov. 16, 1984

[51] Int. Cl.⁴ ............... G06F 11/28; G06F 11/32; G06F 15/00

[52] U.S. Cl. .................... 364/900; 371/62

[58] Field of Search ... 364/200 MS File, 900 MS File; 371/62, 21; 307/200 A, 200 B; 365/200, 201

[56] References Cited

U.S. PATENT DOCUMENTS

| | | | |
|---|---|---|---|
| 4,072,852 | 2/1978 | Hogan | 364/900 |
| 4,197,427 | 4/1980 | Hutcheson et al. | 179/18 FC |
| 4,403,302 | 9/1982 | Young et al. | 364/900 |
| 4,492,820 | 1/1985 | Kennard et al. | 179/90 B |
| 4,513,417 | 4/1985 | Lamb et al. | 371/62 |
| 4,553,204 | 11/1985 | Hashimoto | 364/200 |
| 4,562,550 | 12/1985 | Beatty | 364/492 |
| 4,586,179 | 4/1986 | Sirazi et al. | 371/66 |

OTHER PUBLICATIONS

Watchdog Timer Guards 8748/8749 μC Systems, *Electronic Design*, 10/14/82 by E. V. Thompson.
Comparator-Based Restart Circuit Automatically Revives Stalled μPs, Electronic Design, 9/3/82 by W. E. Earle.

*Primary Examiner*—Archie E. Williams, Jr.
*Assistant Examiner*—Thomas C. Lee

[57] ABSTRACT

Fault tolerant operation of a microprocessor-based control system is provided by proper execution of an operating program stored in a read only memory (ROM) by a central processing unit (CPU), or microprocessor/microcomputer, as determined by monitoring program access of a select memory location within the ROM. Failure to access the select memory location within a designated time period indicates improper CPU operation and allows a shift register to output a reset signal to automatic reset circuitry for reinitializing CPU operation. The automatic reset circuitry monitors CPU operation and continually attempts to reset the CPU until proper resetting thereof is accomplished. A visual and/or aural indication of CPU reset as well as the number of times it is reset is provided to an operator. The CPU is coupled to a host computer for indicating to the host computer that the CPU has been reset and is now ready to receive data from the host computer. The present invention is particularly adapted for use in the headend of a cable television (CATV) system for ensuring proper operation of a CPU used to control program decoders and subscriber encoders, but is not limited in its application to this environment as it has application in any microprocessor-based control system.

11 Claims, 2 Drawing Figures

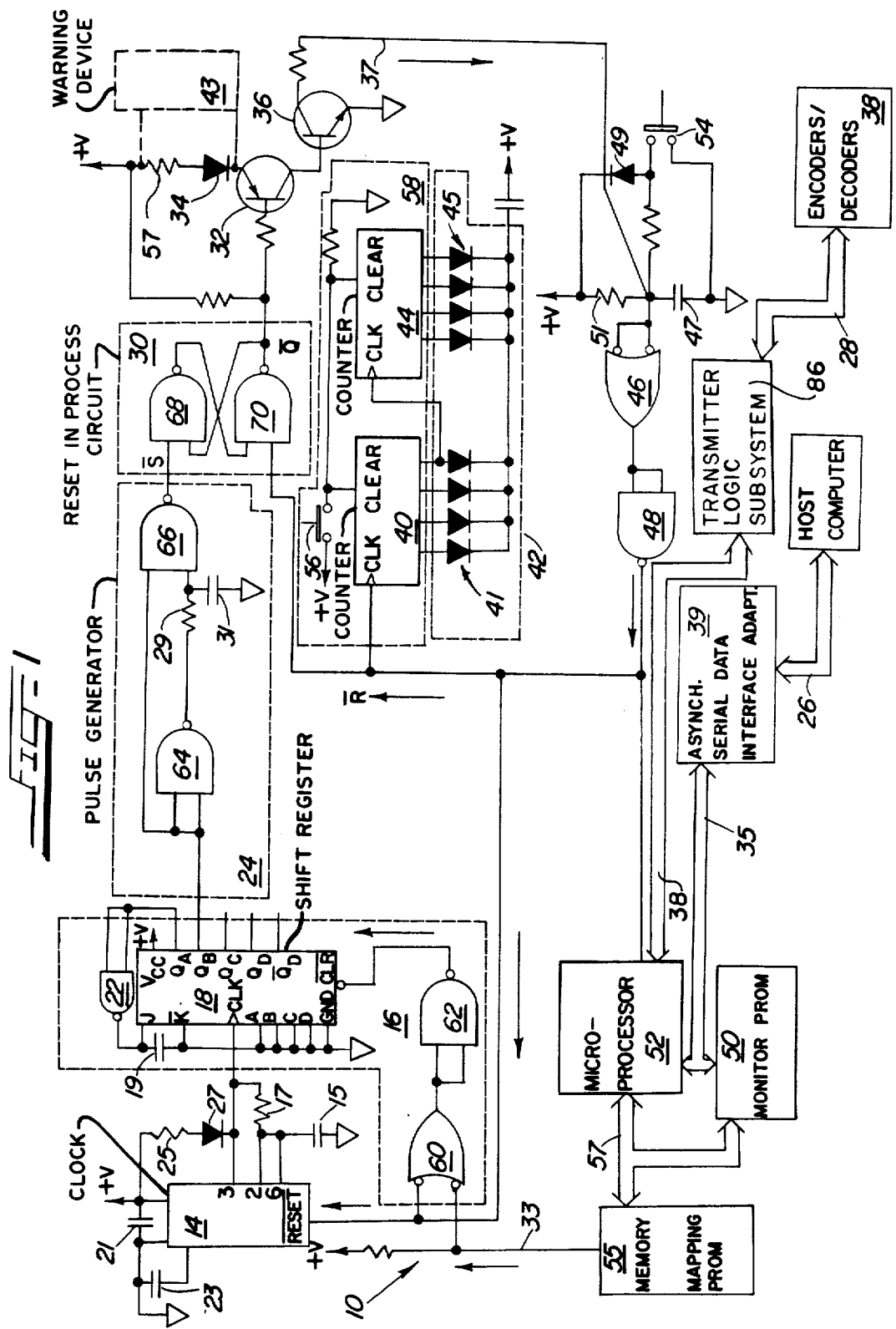

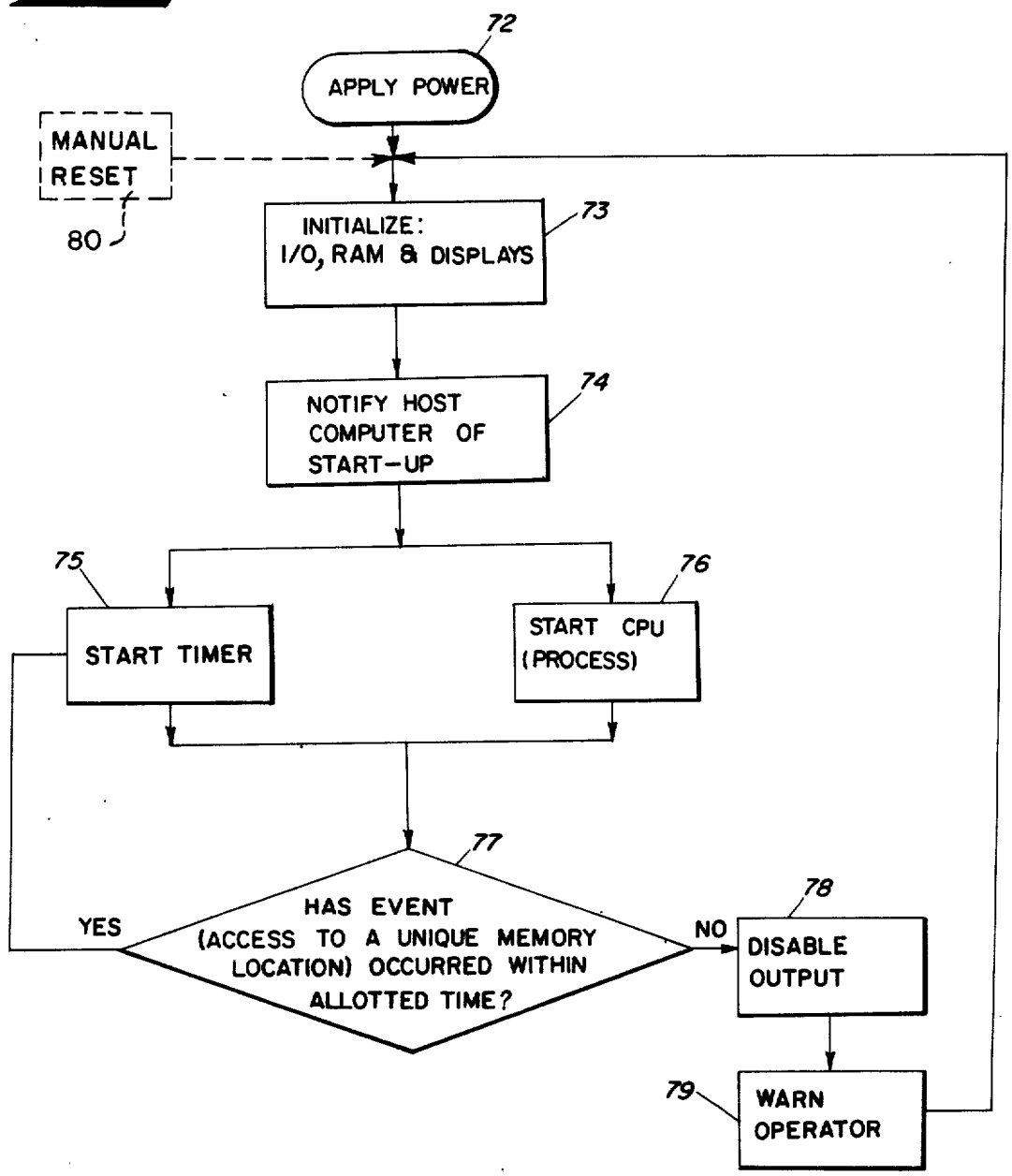

SYSTEM FOR RESETTING THE OPERATION OF A SIGNAL PROCESSING DEVICE UPON THE FAILURE OF ACCESSNG A PREDETERMINED MEMORY LOCATION WITHIN A PREDETERMINED TIME INTERVAL

BACKGROUND OF THE INVENTION

This invention relates generally to central processor units, or microprocessors and microcomputers, and is particularly directed to automatically reinitiating proper central processor unit operation following detection of improper execution of its operating program.

When power is applied to a system incorporating a microprocessor, a microcomputer or a central processor unit, which terms are used interchangeably for purposes of the present application, the microprocessor is typically energized after a suitable time delay. This time delay allows for system stabilization in order to permit various well-defined power supply levels and clock frequencies to be provided to the microprocessor. The microprocessor then generally executes an initialization or power up reset routine wherein the microprocessor program counter is loaded with the starting address contained in a read only memory (ROM). The contents of that memory location initiate the initialization program routine which initializes random access memory (RAM) variables, buffer pointers, and output port latches. In general, this initialization routine defines and establishes the initial conditions for microprocessor operation including a resetting of its logic to an initialized condition from which subsequent operation may proceed.

Microprocessor reset is also required following an interruption of normal microprocessor operation. An interruption in microprocessor operation may be due to various abnormal operating conditions. For example, variations and interruptions of input power may require a reinitialization of the microprocessor. This condition may be due to poor electrical connector contacts, circuit board flexure, a malfunctioning fuse holder switch, or a total loss of line power. In addition, faulty system clock operation and excessive noise on the input lines thereto may result in failure of the microprocessor to execute the program stored therein. U.S. Pat. No. 4,403,302 to Young et al discloses a system for automatically resetting a microcomputer in response to a loss of the system timing reference by comparing the occurrence of a display scan signal with a reference time interval based upon the input power line frequency. An article entitled "Watchdog Timer Guards 8748/8749 μ C Systems" in the Oct. 14, 1982, edition of *Electronic Design* by E. V. Thompson discloses a software watchdog timer arrangement wherein a desired count is loaded into a timer count register during the power-up sequence. At one or more times during the main execution loop, the timer must be reloaded with the desired count before the timer overflows from the previous load or a timer-interrupt will occur. The timer-interrupt service software can perform the controlled system shutdown or, if desired, restart the system with the power-up sequence. Similarly, another article entitled "Comparator-based Restart Circuit Automatically Revives Stalled μ Ps" in the Sept. 3, 1981, edition of *Electronic Design* by W. E. Earle discloses an automatic restart circuit for a microprocessor which includes a quad comparator, in which one comparator acts as a low-voltage sensor, two act as oscillators, and the fourth acts as a wave shaper, and which generates a negative-going restart pulse when either the supply voltage is too low or the microprocessor hangs up and fails to provide periodic "watchdog" reset pulses. Whatever the cause, proper microprocessor operation is precluded until the microprocessor is returned to the aforementioned set of initial conditions.

To accomplish this initialization process, generally two signals are provided to the microprocessor. One input is from a power supply which provides a well-defined voltage level necessary for proper logic circuitry operation. Another input, generally termed the power up reset or restart signal, initiates the initialization routine previously described. These two inputs are generally provided by the same source, e.g., a DC power supply.

In general, microprocessors and microcomputers include reset circuitry and/or program routines which effect the clearing of certain data from memory, the initialization of a stored program sequence, and in some cases the turnoff of certain load devices in response to a command signal generated upon application of input power to the system. In some cases, the system may provide an indication to the user of an input voltage transient or outage requiring the user to turn the system off and/or attempt to reset and restart it where the problem is suspected of only being transitory and no longer present. This approach to resuming normal microprocessor operation is expensive in that it requires constant monitoring of the system by an operator, is unreliable in that it requires a human response to a given system condition, and may be inconvenient particularly where the microprocessor-based system is at a remote location.

The present invention is intended to overcome the aforementioned limitations of the prior art by providing for the automatic reset of a microprocessor upon detection of improper execution of its operating program. The present invention attempts to reset the microprocessor and will continue providing a reset signal thereto until it is properly reinitialized to permit resumption of normal operation. Various indications are provided to an operator and to a host computer of an interruption in normal operation and a resetting of the microprocessor.

OBJECTS OF THE INVENTION

Accordingly, it is an object of the present invention to provide for more reliable operation in a microprocessor-based control system.

It is another object of the present invention to monitor the operation of a central processor unit, detect any irregularities in its operation, and correct for any such irregularities by continually reinitializing its operation to a predetermined set of initial conditions.

Yet another object of the present invention is to provide various indications of abnormal operation in a microprocessor-based system and initiate the automatic resetting thereof.

Still another object of the present invention is to provide reliable, unattended operation in a microprocessor-based control system such as used in a CATV headend controller.

Another object of the present invention is to provide increased operator safety and equipment protection in a microprocessor-based control system.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

FIG. 1 is a combined schematic and block diagram of a microprocessor automatic reset system in accordance with the present invention; and FIG. 2 is a simplified flow chart of the control operations executed by a microprocessor in carrying out the present invention.

DESCRIPTION OF THE PREFERRED EMBODIMENT

Referring to FIG. 1, there is shown a combined block and schematic diagram of an automatic reset system 10 for resetting a microprocessor, or a microcomputer or central processor unit as these terms are used interchangeably in the present application, upon detection of improper operation thereof in accordance with the present invention.

A microprocessor 52 is coupled by means of an address bus 57 to a memory mapping PROM 55 in which is stored a sequence of operating instructions and logic circuitry for executing the stored operating instructions. Various components such as a random access memory (RAM) are understood to be included within microprocessor 52, but are not described herein as their operation in the present invention is conventional in nature and would be readily familiar to those skilled in the appropriate arts. The present invention contemplates operation with a conventional microprocessor 52 and for this reason only those aspects of microprocessor 52 which are unique with respect to the present invention are described herein. Although element 52 is shown as a conventional microprocessor, the present invention is equally applicable to a conventional microcomputer, or central processor unit (CPU).

The present invention is intended for use in a cable television (CATV) system at the headend thereof for controlling viewer access to television programming. Thus, microprocessor 52 is coupled to a host computer 20 via a data bus 35, an asynchronous serial data interface adapter 39 and an asynchronous serial data bus 26. Host computer 20 provides program information as well as subscriber authorization data to microprocessor 52 for controlling subscriber access to CATV programs. Microprocessor 52, in turn, provides such information as subscriber program requests, subscriber polling information, and cable system status information from a subscriber terminal (not shown) to host computer 20 in a two way CATV system. Host computer 20 in addition to providing video programming and subscriber authorization information to microprocessor 52 for distribution to authorized subscribers, also performs such functions as subscriber account billing and the processing of subscriber program requests.

Microprocessor 52 is also coupled via a data bus 38 to a transmitter logic subsystem 86 containing a synchronous serial transmitter and associated support control logic coupled via a synchronous serial bus 28 to a plurality of encoders and decoders 38 which are shown as a single block in the figure for the sake of simplicity. The encoders would typically be located at the CATV headend for assigning various authorization levels to CATV programs. These program authorization levels are used to determine whether a given subscriber is entitled to receive and view a CATV program. The decoders are typically located at a respective remote subscriber terminal and, when enabled, permit the transmitted CATV program to be decoded and viewed by an authorized subscriber. The interface between microprocessor 52 and host computer 20 as well as the encoders and decoders 38 is conventional in nature in the present invention and therefore is not described in greater detail herein.

The microprocessor 52 is also coupled to a monitor PROM 50 which includes a plurality of memory locations in which are stored operating instructions for performing various functions. One function performed under the control of the program stored within monitor PROM 50 is an initialization program routine which initializes the buffer pointers, output port latches, etc., (not shown) of the microprocessor 52. In general, this initialization routine defines and establishes the initial conditions for microprocessor operation including resetting of its logic to an initialized condition, such as beginning operation at the beginning of the reset routine, from which subsequent operation may proceed. Once microprocessor 52 has been properly initialized, it proceeds through a main software execution loop carrying out various functions. Various memory locations within monitor PROM 50 are accessed periodically, e.g., during each cycle of the main execution loop. For example, the hexadecimal D000 memory location may be accessed during the carrying out of the main execution loop. When this location is accessed by a load or a store instruction and following the decoding of this memory location by the memory mapping PROM 55, PROM 55 outputs a logic 0 on line 33. The logic 0 output from the memory mapping PROM 55 is provided to one input of the negated input OR gate 60, to the other input of which is provided a RESET signal from NAND gate 48 as described below. With OR gate 60 having active low inputs, receipt of a logic 0 at either of its inputs will result in a logic 1 being provided to both inputs of NAND gate 62. The output of NAND gate 62 will be a logic 0 signal provided to the active low $\overline{CLR}$ input of shift register 18. The logic 0 input to the $\overline{CLR}$ input of shift register 18 causes the shift register to be cleared with all of its stages assuming a logic 0 state. Thus, OR gate 60 in combination with NAND gate 62 performs an OR function with either a logic 0 output from ROM 50 or a RESET output from microprocessor 52 causing shift register 18 to be cleared. Shift register 18 in combination with OR gate 60 and NAND gate 62 forms a clearable digital delay circuit 16.

Also coupled to shift register 18 is a clock circuit 14 which provides a clocking signal to the CLK input of shift register 18. Clock 14 is energized by a +V supply coupled thereto via capacitors 21 and 23. In a preferred embodiment, clock 14 provides a 50 Hz signal to the CLK input of shift register 18. This frequency is slightly less than the rate at which new data is sequentially provided to a channel, i.e., the frame rate of the CATV video signals. The operating frequency of clock 14 is established by the values of grounded capacitor 15 and resistor 17 and is selected to permit shift register 18 to be cleared at least once during each video frame period which corresponds to the minimum cycle time of the microprocessor's main execution loop.

Shift register 18 is operated in a toggle mode wherein NAND gate 22 couples the $Q_A$ output of shift register 18 back to its J and $\overline{K}$ inputs such that logic 1's and 0's are clocked into the J and $\overline{K}$ inputs of shift register 18 in an alternating manner. Logic 1's are shifted to the output of the shift register from $Q_A$ to $Q_B$ and on down sequentially to $Q_D$. During normal operation of microprocessor 52 in which a select memory location in ROM 50 is accessed during each pass through of the main execution program, a logic 0 is provided to the active low $\overline{CLR}$ input of shift register 18 which, as a result, is cleared. During normal operation, the shift register 18 is cleared before a logic 1 can be shifted into the second stage $Q_B$ output to permit it to change from a logic 0 to a logic 1.

However, if shift register 18 is not cleared during one cycle of clock 14, its $Q_B$ output will go to a logic 1, which output is provided to a negative pulse generator 24. The negative pulse generator 24 is comprised of NAND gates 64 and 66, resistor 29, and capacitor 31. During normal operation of microprocessor 52, the $Q_B$ output of shift register 18 is a logic 0 resulting in a logic 1 being output by the negative pulse generator 24. However, with shift register 18 no longer cleared periodically by a logic 0 output from ROM 50, a logic 1 is provided to both input pins of NAND gate 64 resulting in a logic 0 being provided via resistor 29 and grounded capacitor 31 to one active low input pin of NAND gate 66. To the other input pin of NAND gate 66 is provided the logic 1 input from the $Q_B$ output pin of shift register 18 resulting in a negative pulse being provided from the negative pulse generator 24 to a reset in process circuit 30. Thus, when shift register 18 is no longer cleared by microprocessor 52, a negative pulse is provided by the negative pulse generator 24 to the reset in process circuit 30.

The reset in process circuit 30 is comprised of cross-coupled NAND gates 68 and 70 and functions as a latch circuit. The set latch signal is provided from the negative pulse generator 24 to the $\overline{S}$ input of NAND gate 68, the output of which is provided to one input of NAND gate 70. The $\overline{Q}$ output of NAND gate 70 is provided back to one input of NAND gate 68. The other input to NAND gate 70 is an $\overline{R}$ reset latch signal provided from microprocessor 52 as described below. When the $\overline{R}$ input is not provided to NAND gate 70, a negative pulse at the $\overline{S}$ input will set the reset in process circuit 30 resulting in a low $\overline{Q}$ output being provided to the base of PNP transistor 32. Therefore, the output from the reset in process circuit 30 will be a logic 0 when this circuit is set such as when the $\overline{S}$ input from the negative pulse generator circuit 24 goes low with the $\overline{R}$ input high and will be reset by the transition of the $\overline{R}$ input to a low state. Under normal operating conditions, both of these inputs to the reset in process circuit 30 are a logic 1 such that it will provide a logic 1 output to the base of transistor 32. The $\overline{R}$ input has priority over the $\overline{S}$ input such that the $\overline{Q}$ output is controlled directly by the $\overline{R}$ input. When the $\overline{R}$ input is 0, $\overline{Q}$ will be a logic 1 indicating that microprocessor 52 is being reset.

The $\overline{Q}$ output from the reset in process circuit 30 drives a transistor network comprised of PNP transistor 32 and NPN transistor 36. A logic 0 $\overline{Q}$ output from the reset in process circuit 30 will result in the turn on of PNP transistor 32 and the illumination of a red light emitting diode (LED) 34 coupled between its emitter and a +V source. Illumination of LED 34 indicates that microprocessor 52 is being reset. Also shown in dotted line form is an aural warning device 43 coupled between the +V source and PNP transistor 32. Aural warning device 43, which may be conventional in nature such as a combination of a test probe with an oscillator and a piezoelectric crystal to monitor the voltage across LED 34 and current limiting resistor 57, may be used either alone or in combination with LED 34 to provide an audio indication of the resetting of microprocessor 52.

Current through PNP transistor 32 not only turns on LED 34, but also biases NPN transistor 36 on causing current to be drained off of a grounded timing capacitor 47 within microprocessor 52. NPN transistor 36 is coupled to microprocessor 52 via line 37. With NPN transistor 36 rendered conductive, current is drained off of timing capacitor 47 causing the voltage across capacitor 47 to go exponentially toward 0. When the input from capacitor 47 to the active low OR gate 46 goes to a logic 0, the output from OR gate 46 goes to a logic 1 causing NAND gate 48 to output a logic 0. A logic 0 output from NAND gate 48 indicates to various portions of the automatic reset system 10 that microprocessor 52 is being reset.

For example, a reset signal from NAND gate 48 is provided via asynchronous serial data bus 26 to the host computer 20 via an asynchronous serial data interface adapter 27. The asynchronous serial data interface adapter 27 is also coupled via data bus 29 to the microprocessor 52 for converting serial data from the host computer 20 to parallel form for use by microprocessor 52. This indicates to the host computer 20 that microprocessor 52 has been reset and that data may now be provided from the host computer 20 via bus 26 to microprocessor 52 for exercising proper system control. In addition, the reset signal is provided from NAND gate 48 to a binary counter circuit 58 comprised of cascaded counters 40, 44. A low output from NAND gate 48 to the CLK input of counter 40 which drives LED's 41 and counter 44 which, in turn, drives LED's 45 causes counter circuit 58 to be incremented. Therefore, counters 40, 44 count the number of times microprocessor 52 is reset and LED's 41, 45 provide a visual indication of the number of times that microprocessor 52 has been reset since counters 40, 44 were last reset. In one example of the present invention, 8 LED's are provided to permit up to 255 microprocessor resets to be counted and indicated in binary form on LED's 41 and 45. A +V source is coupled to the CLEAR inputs of counters 40, 44 via manual switch 56 such that, upon engagement of manual switch 56, counters 40 and 44 are reset to 0, with a corresponding visual display provided by LED's 41, 45.

The reset signal is also provided from microprocessor 52 to the $\overline{RESET}$ input of clock 14 to provide for the resetting thereof. When clock 14 is reset, the shift register 18 is cleared with its $Q_B$ output going to a logic 0. In addition, the $\overline{R}$ reset signal is provided to one input of NAND gate 70 for resetting the reset in process circuit 30 resulting in a logic 1 $\overline{Q}$ output therefrom and the turn-off of the transistor network comprised of transistors 32, 36 as well as LED 34.

When power is initially applied to microprocessor 52 from the +V source, capacitor 47 charges exponentially toward +V voltage via pull-up resistor 51. When the input voltage to OR gate 46 reaches a logic 1, its output to NAND gate 48 is a logic 0 and the output of NAND gate 48 is a logic 1. This output of NAND gate is the $\overline{R}$ reset signal, which when at a logic 1 state indicates that the power up initialization of the microprocessor 52 is complete. Microprocessor 52 then executes a software reset routine which includes an initialization program for initializing various components of the microprocessor such as parallel ports and an asynchronous serial data interface adapter chip, neither one of which is shown in FIG. 1 for simplicity sake. Once initialization is complete, microprocessor 52 begins normal operation and proceeds through the main execution loop. There is also provided a manual override reset switch 54 to permit the microprocessor 52 to be manually reset as desired during manual testing. When the manual override reset switch 54 is selected, capacitor 47 discharges causing a logic 0 to be provided to the active low OR gate 46 which, in turn, causes NAND gate 48 to provide a logic 0 to the microprocessor 52. This results in the resetting of the clock 14 and the reset in process circuit 30. Diode 49 provides a discharge path for capacitor 47 while capacitor 47 and resistor 51 provide a time delay following the application of power to provide proper power-on-reset timing for the microprocessor 52.

Referring to FIG. 2, there is shown a simplified flow chart of the operations performed by microprocessor 52 in the automatic resetting thereof. Power is initially applied to microprocessor 52 at step 72 wherein capacitor 47 is pulled up to 5 VDC via pull-up resistor 51. When the input voltage to OR gate 46 reaches a logic 1, the power-up initialization is complete and microprocessor 52 then executes a reset software routine which includes an initialization program for initializing various components thereof as shown at step 73. Components and peripheral devices of microprocessor 52 which are then initialized include input/output (I/O) ports, various peripheral displays and encoders/decoders 38. Microprocessor 52 then indicates to the host computer 20 via the asynchronous serial data bus 26 that it is beginning operation and is ready to receive initialization data from host computer 20. In addition, the reset input is removed from shift register 18 which is then ready to receive clock signals from timer circuit 14. Microprocessor 52 then performs two functions. It starts the operation of the timer, or clock, circuit 14 at step 75 by providing a $\overline{RESET}$ input thereto and proceeds through the main execution loop of the program stored in the monitor PROM 50 at step 76. The microprocessor then determines whether a predetermined event, which in the preferred embodiment of the present invention is program access to a unique memory location in the memory mapping PROM 55, has occurred within a selected time interval as determined by the combination of clock circuit 14 and the digital delay circuit 16. If the microprocessor determines that this event has occurred within the allotted time at step 77, this indicates that microprocessor 52 is properly proceeding through the main execution loop of its software program, and the program then loops back to step 75 where the timer circuit 14 looks for the next check of microprocessor program execution. If at step 77 it is determined that the aforementioned designated event has not occurred within the allotted time, the program branches to step 78 for disabling the outputs of microprocessor 52 to the encoders and decoders 38 in order to prevent either unauthorized viewer access to CATV programming or the withholding of authorized programming from subscribers. At step 79, the program warns the system operator such as by, for example, providing a visual or aural indication of improper microprocessor operation. The program then loops back to the start of the program which is again executed in response to a manual reset at step 80 or the re-application of power.

There has thus been shown an arrangement for automatically resetting a microprocessor upon detection of improper execution of its operating program. A predetermined location in the microprocessor's address space is monitored in order to determine sequential program access during the execution thereof. If this memory location is not accessed within a predetermined time period during the carrying out of the main executive loop, i.e., slightly longer than a TV frame period, the microprocessor is automatically reset and the operator is provided a visual and/or aural indication of this occurrence. The present invention thus provides for the unattended operation of a microprocessor-based system in making such systems more reliable and safer.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A signal processing means responsive to operating signal inputs from a host computer for controlling the operation of apparatus coupled to said signal processing means, said signal processing means including a programmed memory having a plurality of memory locations for storing instruction words which define an operating sequency for controlling said apparatus and logic means for sequentially accessing said plurality of memory locations in executing the instruction words over a first time interval in accordance with said operating sequence to provide control signals to operate said apparatus, a system for generating a reset command for directing said signal processing means to a predetermined initial point in said operating sequence from which a predetermined sequence of initializing operations is automatically initiated, said system comprising:

timing means for generating a second time interval, wherein said timing means is coupled to said signal processing means;

detection means coupled to said timing means and to the programmed memory of said signal processing means and responsive to a memory access signal output therefrom indicating a predetermined memory location has been accessed in executing said instruction words for generating a first output signal if said memory access signal is not received within said second time interval;

first circuit means coupled to said signal processing means and to said detection means for generating a continuous reset command in response to receipt of said first output signal;

second circuit means coupled to said first circuit means and to said signal processing means for providing said continuous reset command thereto and responsive to a second output signal from said signal processing means indicating the resetting thereof for terminating said continuous reset command and wherein said second output signal is further provided to said timing means for the resetting thereof to zero and to said detection means for the resetting thereof following the resetting of said signal processing means; and counter/display means coupled to said signal processing means for counting the number of times said signal processing means is reset and providing a visual indication thereof.

2. A system in accordance with claim 1 wherein said first time interval equals the time required for execution of one loop of said operating sequence by said signal processing means.

3. A system in accordance with claim 2 wherein said second time interval is greater than said first time interval.

4. A system in accordance with claim 1 wherein said programmed memory comprises a memory mapping programmable read only memory.

5. A system in accordance with claim 1 wherein said signal processing means is coupled to said host computer by means of a bi-directional data bus for receiving said operating signal inputs therefrom and for providing said second output signal thereto for indicating that said signal processing means has been reset.

6. A system in accordance with claim 1 wherein said apparatus coupled to said signal processing means includes a plurality of CATV encoders and decoders over which control is exercised by said signal processing means.

7. A system in accordance with claim 1 further including indicator means coupled to said second circuit means and responsive to said reset command for providing an indication of the reset of said signal processing means.

8. A system in accordance with claim 7 wherein said indicator means comprises a light emitting diode for providing a visual indication of the reset of said signal processing means.

9. A system in accordance with claim 7 wherein said indicator means comprises an aural warning device for providing an audio indication of the reset of said signal processing means.

10. A system in accordance with claim 1 further comprising manual reset means coupled to said counter means and to said visual display means for the manual resetting thereof.

11. A system in accordance with claim 1 further comprising manual override reset means coupled to said signal processing means for the manual resetting thereof.

* * * * *